Dec. 21, 1948.  R. E. FAUST  2,456,776
ECCENTRIC CHUCK

Filed Feb. 5, 1946  6 Sheets-Sheet 1

INVENTOR.
RUDOLPH E. FAUST
BY
ATTORNEY

Dec. 21, 1948.　　　R. E. FAUST　　　2,456,776
ECCENTRIC CHUCK

Filed Feb. 5, 1946　　　6 Sheets-Sheet 2

INVENTOR.
RUDOLPH E. FAUST
BY
ATTORNEY

Dec. 21, 1948.   R. E. FAUST   2,456,776
ECCENTRIC CHUCK
Filed Feb. 5, 1946   6 Sheets-Sheet 3
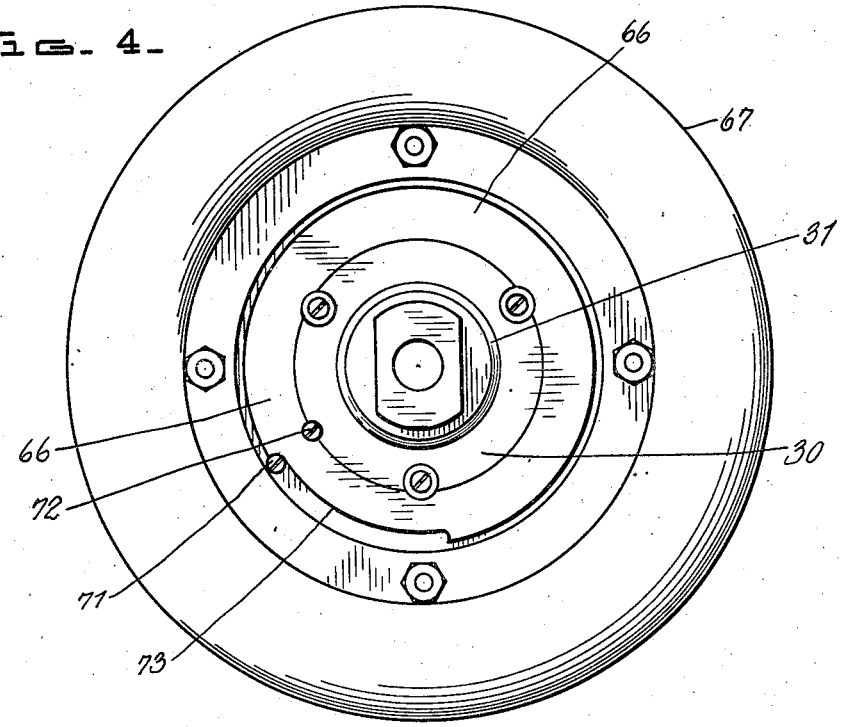
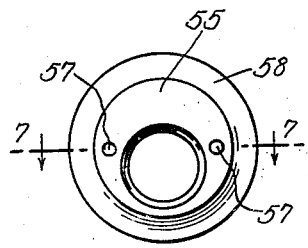
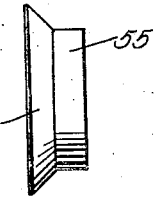
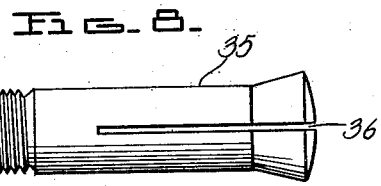
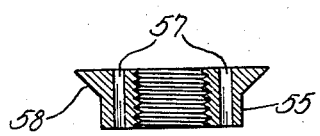
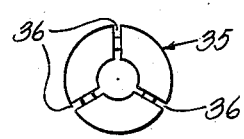
INVENTOR.
RUDOLPH E. FAUST
BY
ATTORNEY Dec. 21, 1948.　　　　R. E. FAUST　　　　2,456,776
ECCENTRIC CHUCK
Filed Feb. 5, 1946　　　　　　　　　　6 Sheets-Sheet 4

INVENTOR.
RUDOLPH E. FAUST
BY
ATTORNEY

Dec. 21, 1948.  R. E. FAUST  2,456,776
ECCENTRIC CHUCK

Filed Feb. 5, 1946  6 Sheets-Sheet 5

INVENTOR.
RUDOLPH E. FAUST
BY
ATTORNEY

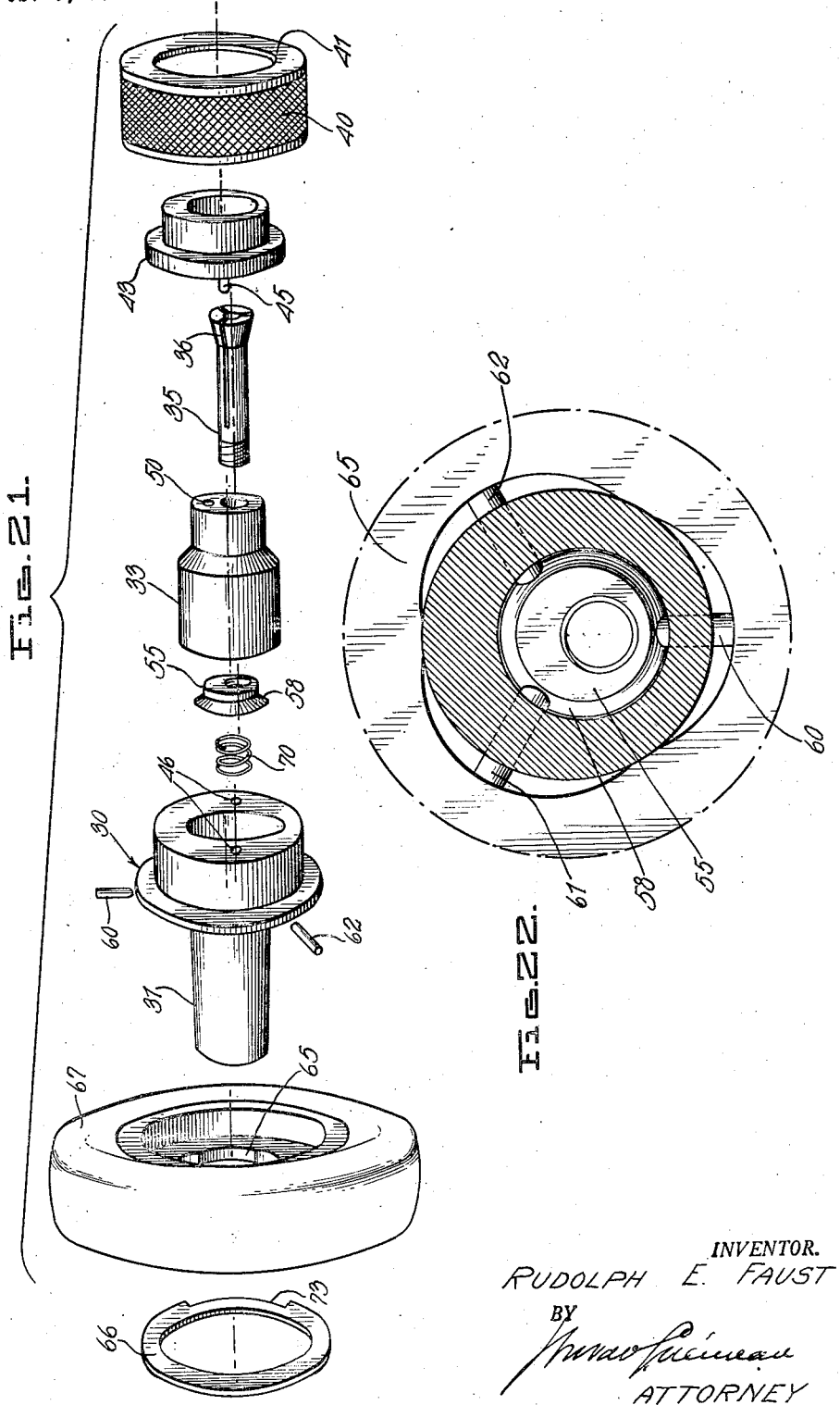

Patented Dec. 21, 1948

2,456,776

UNITED STATES PATENT OFFICE 2,456,776

ECCENTRIC CHUCK

Rudolph E. Faust, Brooklyn, N. Y.

Application February 5, 1946, Serial No. 645,579

7 Claims. (Cl. 279—6)

This invention relates to chucks for turning eccentrics.

Heretofore it has been common practice to mount the chuck element on a rotating head so that it can be traversed perpendicularly to the axis of the head to vary the extent to which the axis of such element is offset with respect to the axis of the head. Such an arrangement results in an unbalanced condition which produces vibration, especially at high speed. This unbalancing can be compensated for by counterweight of suitable size and location, but this means changing the size and/or location, of the counterweight with every change in eccentricity of the chuck element.

Another common practice has been to use a chuck having independently movable jaws so that the article to be turned can be gripped eccentrically. This method likewise produces an unbalanced condition which is difficult and troublesome to compensate.

One of the principal objects, therefore, of the present invention is the provision of a chuck whose eccentricity may be varied with only a negligible amount of unbalancing.

According to the present invention the chuck comprises two essential parts, an outer one having its periphery concentric with respect to the axis about which the chuck as a whole turns and provided with a cylindrical bore or recess offset with respect to such axis, and an inner part snugly fitting within the bore in the first part. This inner part is also provided with a cylindrical bore or recess with respect to its periphery to receive a lug on the article to be turned eccentrically, either directly or preferably indirectly through the intermediary of a collet.

By turning the inner part with respect to the outer part the extent to which the bore in the inner part is offset with respect to the axis of the chuck can be varied. During the turning of an article held in the chuck, the two parts and the collet act, so far as centrifugal forces are concerned, as a single solid block symmetrically arranged about the chuck axis except for the bore of the collet. As this bore is small in volume and is offset only slightly from the chuck axis the consequent unbalancing in centrifugal forces is negligible.

A further object of the invention is the provision of means whereby the chuck can readily be set for any desired degree of eccentricity. This is attained by providing a series of radial graduations on the end of one of the above-mentioned parts adapted to register selectively with a single radial graduation on the end of the other part.

Other features of the invention will be apparent from the description of one suitable form of construction illustrated, by way of example, in the accompanying drawings, wherein:

Figure 4 is a rear elevation of the chuck;

Figure 5 is an end elevation of the conical collar by which the collet is retracted;

Figure 6 is a side elevation of the same;

Figure 7 is a section on the line 7—7 of Fig. 5;

Figures 8 and 9 are side and end views respectively of the collet;

Figure 21 is an exploded view of the component parts of the chuck; and

Figure 22 is an elevation of the cam ring and pins which retract the collet.

Figure 1:
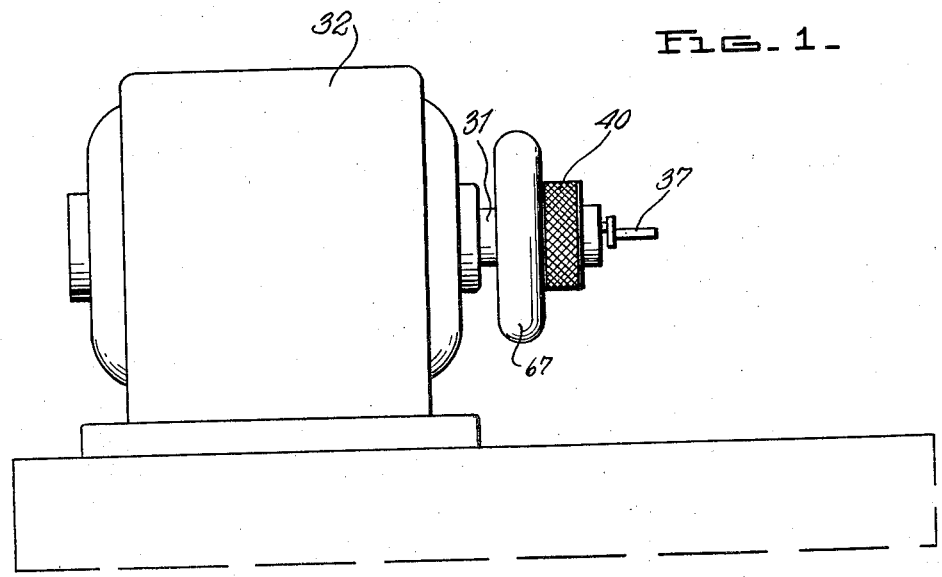
Figure 1 is a side elevation of a lathe head and a chuck constructed in accordance with the present invention mounted thereon.

As shown, the chuck comprises a body portion 30 which carries exteriorly or interiorly all the other parts of the chuck. At one end of this body portion 30 has a tapered shank 31 for insertion into a lathe head 32 in the usual manner.

The body 30 has a cylindrical bore or recess the center line of which is parallel to but offset with respect to the axis about which the chuck as a whole rotates. Rotatably mounted in this bore is a cylindrical block 33 which, in turn, has a cylindrical bore or recess the center line of which is parallel to but offset with respect to the center line of the block 33. By turning the block 33 in the body 30 one eccentricity can be made to add to or subtract from the other. Preferably, though not necessarily, the extent to which the bore in the body 30 is offset is equal to the extent to which the bore in the block 33 is offset. This is advantageous because, if the eccentricities or offsets are equal the eccentricity of the bore in the block 33 with respect to the axis of the rotation of the chuck can be adjusted to any value from zero up to double the individual eccentricities.

In the bore in the block 30 is mounted a collet 35, desirably of standard form and size. The outer end of the bore is flared outwardly with an angle equal to that of the conical end of the collet. The collet is provided with the usual slots 36 to permit the conical end to be contracted a few thousandths of an inch to grip a lug on the article 37 to be turned. This contraction is brought about by retracting the collet to cause the flared opening of the recess to engage and compress the conical head of the collet.

Essentially, therefore, there are two adjustments. First, an angular adjustment of the block 33 with respect to the body 30 to fix the eccentricity of the collet at any desired value. Second, an axial adjustment of the collet is the block 33 to contract its conical slotted end to grip the article to be turned.

Various means may be employed for releasably locking the block 33 in the desired angular position with respect to the body 30. The method employed in the construction illustrated involves exerting pressure endwise on the block 33 by causing two parts of the body assembly to approach each other and thereby frictionally engage the two ends of the block. The inner end of the bore in the body is provided with a shoulder 42 against which the inner end of the block rests. To press the block 33 against this shoulder a knurled nut 40 is provided. This nut has an inturned flange 41. This nut is in threaded engagement with the body 30 so that by turning it the flange 41 can be made to press the block 33 against a shoulder 42 at the rear end of the recess in the body 30. If the flange 41 engaged the block 33 directly its rotation would be liable to turn the block 33 with it and so change the angular adjustment of the latter. To prevent that happening a ring 43 is provided engaging the front end of the block 33 and the rear face of the flange 41. This ring 43 has two pins 45 on its rear face for sliding engagement with holes 46 in the body 30 (see Fig. 21). Consequently it cannot turn with respect to the body and yet is free to move axially thereto.

Figure 2:
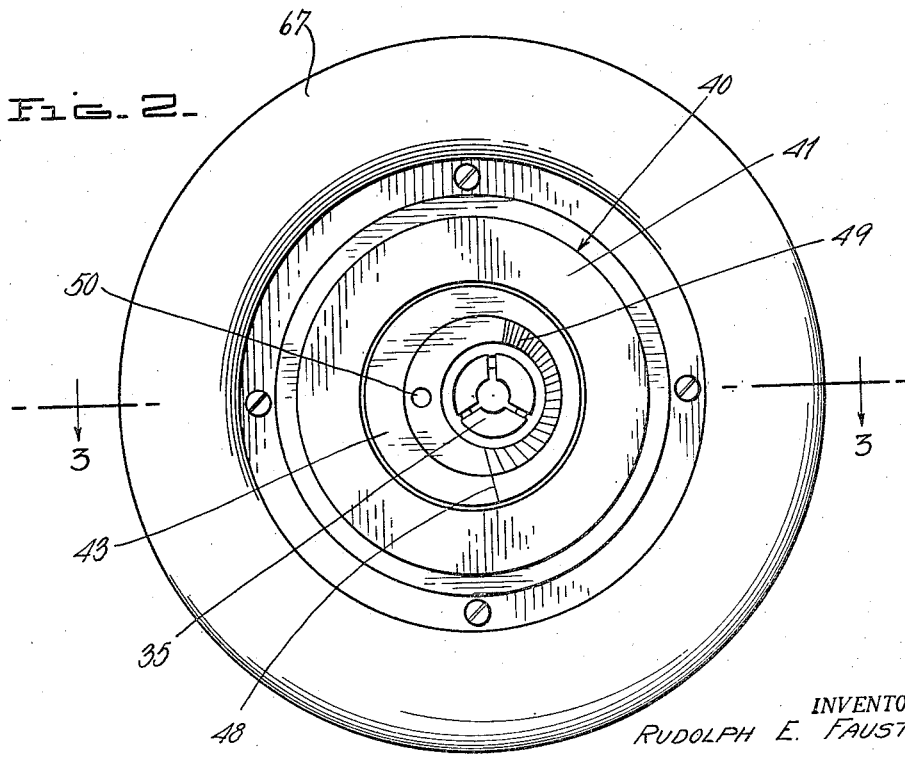
Figure 2 is a front elevation of the chuck.

So far as rotation of the block 33 in the body 30 is concerned the ring 43 in view of its non-rotatable mounting on the end of the body proper acts as if it were an integral part of the body and hence the angular position of the block 33 to the body 30 can be determined by a reference mark 48 on the outer face of the ring (Fig. 2). The other graduations 49 are placed on the outer end of the block 33. The latter set of graduations are calibrated so that each space corresponds to a difference in eccentricity of, say, 1/64 inch. As shown, the graduations are such that the chuck may be set for any eccentricity from zero to 3/8 inches in increments of 1/64 inch.

To enable the position of the block 33 to be adjusted angularly, a hole 50 is provided in the outer end of the block 33 to receive a pin on a special adjusting tool, not shown.

As previously explained, the gripping of the article to be eccentrically turned by contraction of the outer end of the collet requires means for drawing the collet axially inwards. These means can operate either through the hollow bore of the shank 31 or through the walls of the body or its shank in such a way as not to interfere with the rotation of the body and other parts. As such means must be capable of operating whatever the eccentricity of the collet may be it is necessary that the operation of such means be independent of the degree of eccentricity of the collet with respect to the chuck. These requirements are met by providing a cone-ring 55 having a threaded bore to receive the threaded rear end of the collet. The cone-ring and collet are arranged so that they can move axially as a unit, which, for convenience, may be termed the collet assembly. A spring 70 presses against the rear end of this assembly so to hold the assembly in forwardly extended position until the retracting means, now to be described, are brought into operation.

Figure 3:
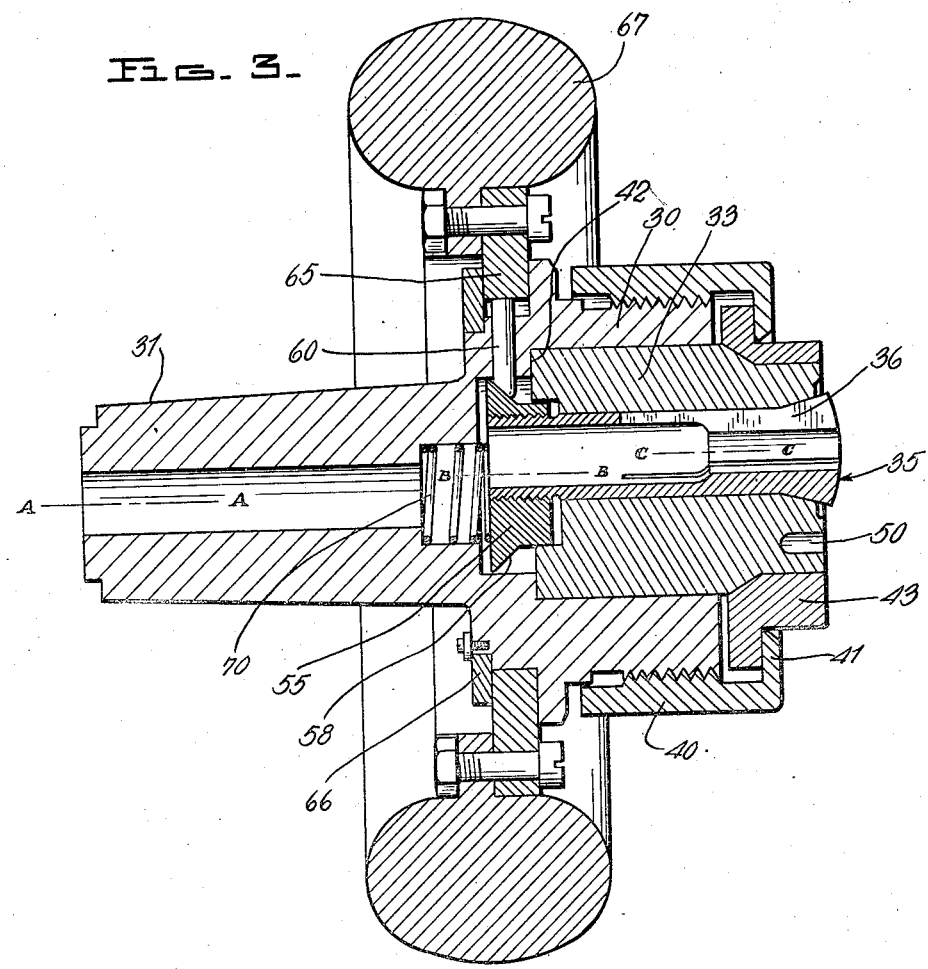
Figure 3 is a section of the line 3—3 of Figure 2.

The ring 55 has a conical surface 58 which has a much greater angle than the angle of the cone at the slotted end of the collet to enable the collet assembly to be readily retracted axially by applying pressure on the conical surface 58 radially with respect to the collet axis. This radial pressure is produced by a series of pins, 60, 61 and 62 arranged symmetrically around the cone ring 55. For forcing these pins inwardly against the conical surface 58 and thereby retracting the collet, a cam ring 65 is provided having three cam surfaces, one for each pin, as shown in Fig. 22. The peaks of these surfaces ride on a shoulder on the body 30, as shown in Fig. 3. The cam ring is held in place by a detachable ring 66. To enable the cam ring to be turned a hand-wheel 67, preferably of hard rubber or the like, is clamped to its periphery.

Figure 10:
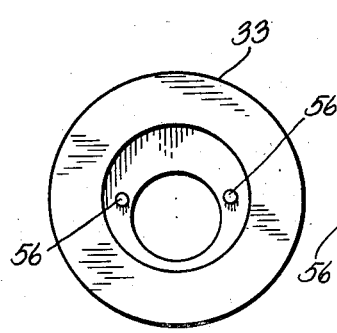
Figures 10, 11 and 12 are rear, side and front elevations respectively of the block which holds the collet.
Figure 11:
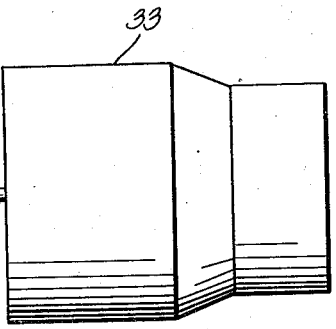
Figure 12:
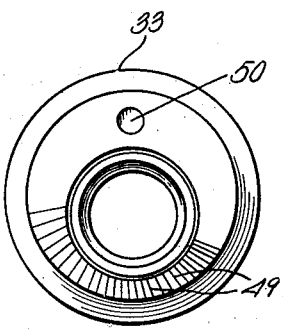
Figure 13:
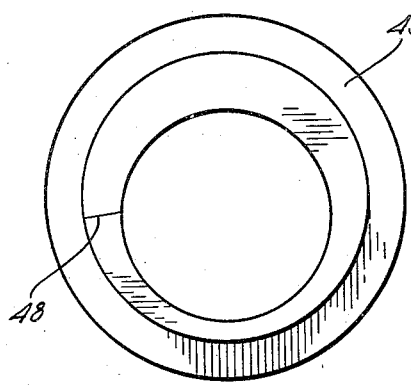
Figures 13, 14 and 15 are front, rear and side elevations respectively of the clamping ring which holds the eccentric block in angular position.
Figure 14:
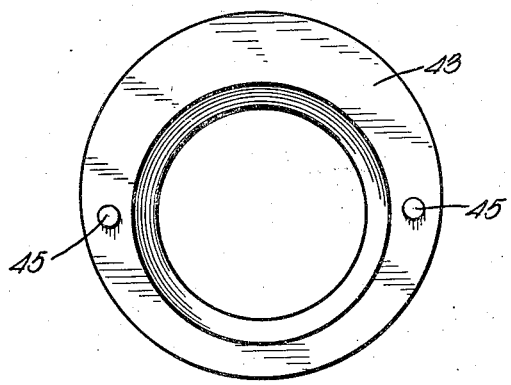
Figure 15:
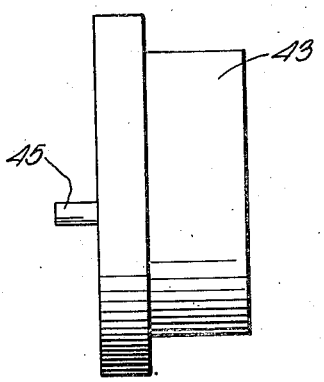
Figure 16:
Figures 16 and 17 are side and end views of the collet releasing spring.
Figure 17:
Figure 18:
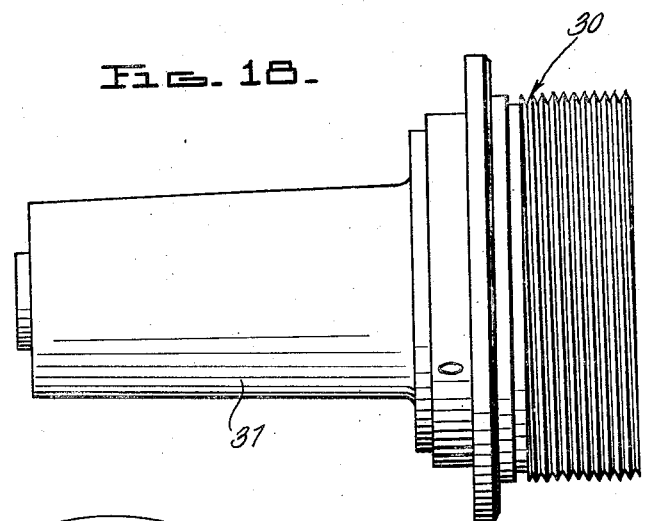
Figures 18, 19 and 20 are side, rear and front elevations respectively of the chuck body with its shank, all other parts being removed.
Figure 19:
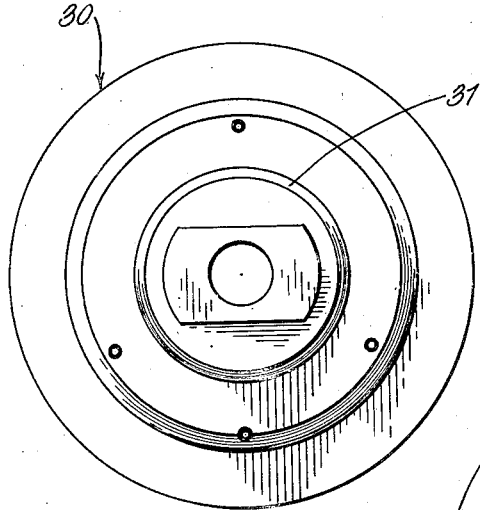
Figure 20:
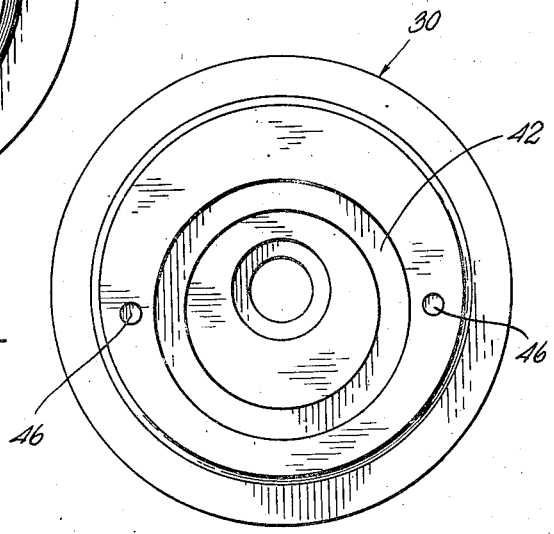

It is necessary that as the block 33 is turned to change the eccentricity of the collet, there be no change in the relative radial positions of the pins with respect to the conical surface 58. This means that this latter surface must at all times be concentric with the periphery of block 33 and not with the bore therethrough in which the collet slides. On the other hand the bore of this ring 55 must be offset to receive the threaded end of the collet. The degree of offset of the bore of the cone-ring is equal to the extent of offset of the recess in the block 33 which receives the collet, so that by arranging the ring and block so that these two offsets are diametrically opposite, the periphery of the ring and the periphery of the block 33 will be concentric. This relative position of the cone-ring and the block 33 is maintained by two pins 56 mounted on the rear face of the block 33 (Figs. 10 and 11) which have sliding engagement with holes 57 in the cam ring (Figs. 5, 6 & 7).

It is desirable that the range of movement of the cam ring 65 be restricted to the range between the cam position in which the pins can be fully extended outwardly (collet release position) to the cam position in which the pins are pressed inwards (collet contraction position) the maximum distance provided for by the cam surface. With three pins and cam surfaces with the contours shown in the drawings this means a range of movement of around 60°. Then, by turning the hand-wheel as far as it will go in one direction, the operator can be certain that the cam has been moved into the proper position for the spring 70 to move the collet assembly forward to release the article to be turned. To limit the range of movement of the hand-wheel in this way, the retaining ring 66 is cut away peripherally for about 60° at 73, as shown in Fig. 4, and a stud 71 is inserted in the cam ring 65 to engage one or other of the ends of this cutaway portion. A stud 72, inserted half in the ring 66 and half in the body 30, ensures proper angular positioning of the cutaway part of the cam ring, the pins and other elements.

What I claim is:

1. A lathe chuck for turning eccentrics comprising an outer hollow body member having a bore parallel to but offset with respect to the axis about which the chuck as a whole rotates, a cylindrical inner block member adapted to fit within the bore of the outer member and having a bore parallel to but offset with respect to its cylindrical outer surface, a collet for grasping a lug on the article to be eccentrically turned slidably fitting within the bore of the inner member, and means including a clamping ring rotatively rigid and axially movable with respect to said outer body member for clamping said members together in adjusted position.

2. A lathe chuck for turning eccentrics comprising an outer hollow body member having a bore parallel to but offset with respect to the axis about which the chuck as a whole rotates, a cylindrical inner block member adapted to fit within the bore of the outer member and having a bore parallel to but offset with respect to its cylindrical outer surface, a collet for grasping a lug on the article to be eccentrically turned slidably fitting the bore of the inner member, a cone ring rotatively rigid and axially movable with respect to said outer body member and threadably engageable with said collet for axially moving said collet one of said members having a series of radial graduations on the end thereof adapted to register selectively with a single radial graduation on the end of the other member to indicate the degree of eccentricity of said chuck element with respect to said chuck axis, and means for clamping said members together in adjusted position.

3. A lathe chuck for turning eccentrics comprising an outer hollow body member having a bore parallel to but offset with respect to the axis about which the chuck as a whole rotates, a cylindrical inner block member adapted to fit within the bore of the outer member and about a shoulder at the inner end of such bore, said block member having a bore parallel to but offset with respect to its cylindrical outer surface, a collet for grasping a lug on the article to be eccentrically turned slidably fitting the bore of the inner member, a ring engaging the outer end of said block member carried by the outer member and movable axially but not angularly with respect thereto, and means for forcing said ring against the outer end of said block member to clamp said members together in adjusted position.

4. A lathe chuck comprising a rotatable hollow head having a cylindrical bore to receive a collet, the outer end of the bore being conical to engage the conical end of the collet and contract the latter when the collet is retracted into said head, a member having a conical surface on its periphery with its large end further from the conical head on the collet arranged inside said head and threadedly secured to the other end of said collet, said member being rotatively rigid and axially movable with respect to said hollow head, a pin slidably mounted in a radial aperture in said head in register with said conical surface so that when the pin is forced radially inwards against said conical surface said member and the collet attached thereto are retracted and the conical end of the latter is contracted, and means for forcing the pin radially inwards.

5. A lathe chuck for turning eccentrics comprising an outer hollow body member having a bore parallel to but offset with respect to the axis about which the chuck as a whole rotates, a cylindrical inner block member adapted to fit within the bore of said body member and having a bore parallel to but offset with respect to its cylindrical outer surface to the same extent as the bore in said body member is offset, a collet for grasping a lug on the article to be eccentrically turned slidably fitting within the bore of the inner member, a cone ring rotatively rigid and axially movable with respect to said outer body member and threadedly engageable with said collet for axially moving said collet, one of said members having a series of radial graduations on the end thereof adapted to register selectively with a singly radial graduation on the end of the other member to indicate the degree of eccentricity of said chuck element with respect to said chuck axis, and means for clamping said members together in adjusted position.

6. A lathe chuck for turning eccentrics comprising a rotating member having a bore of adjustable eccentricity with respect to the axis of the chuck as a whole, said bore being cylindrical with an outwardly flaring conical portion at its outer end, a collet slidably mounted in said bore, means including a cone ring threadedly engageable with said collet and axially movable with respect to said rotating member for retracting the collet to contract its outer end by mutual engagement of the conical surfaces on said bore and said collet, a hand-wheel with a cam ring for operating said means, and radially disposed pins interconnecting said cone ring and said cam ring.

7. A lathe chuck for turning eccentrics comprising an outer hollow body member having a bore offset with respect to the axis about which the chuck as a whole rotates, a cylindrical inner block member adapted to fit within the bore of said outer member and having a bore offset with respect to its cylindrical outer surface, a collet for grasping a lug on an article to be eccentrically turned slidably movable within the bore of the inner member, a cone ring rotatively rigid and axially movable with respect to said outer body member and threadedly engageable with said collet for axially moving said collet, and means including a clamping ring rotatively rigid and axially movable with respect to said outer body member for clamping said members together in adjusted position, said inner member having a series of radial graduations at an end thereof adapted to register selectively with a single radial graduation on said clamping ring to indicate the degree of eccentricity of said chuck with respect to said chuck axis.

RUDOLPH E. FAUST.

REFERENCES CITED

The following references are of record in the file of this patent:

UNITED STATES PATENTS

| Number | Name | Date |
|---|---|---|
| 605,166 | Johnson | June 7, 1898 |
| 981,566 | Jarvis | Jan. 10, 1911 |
| 1,113,958 | Crance et al. | Oct. 20, 1914 |
| 1,174,309 | Clermont et al. | Mar. 7, 1916 |
| 2,192,024 | Breitbarth et al. | Feb. 27, 1940 |
| 2,273,377 | Rice et al. | Feb. 17, 1942 |
| 2,396,006 | Hall | Mar. 5, 1946 |

FOREIGN PATENTS

| Number | Country | Date |
|---|---|---|
| 352,190 | France | Aug. 4, 1905 |
| 26,860 | Denmark | Nov. 8, 1920 |